United States Patent [19]

Lin

[11] Patent Number: 5,559,534

[45] Date of Patent: Sep. 24, 1996

[54] PHOTOELECTRIC SENSOR FOR AN X-Y POSITION DEVICE

[75] Inventor: Chia-Hui Lin, Hsin Tien, Taiwan

[73] Assignee: Sysgration Ltd., Taiwan

[21] Appl. No.: 506,958

[22] Filed: Jul. 28, 1995

[51] Int. Cl.⁶ .................................................. G09G 3/02
[52] U.S. Cl. .......................................... 345/165; 250/221
[58] Field of Search ...................................... 345/163, 164, 345/165, 166, 167, 161, 156; 250/221, 231.14; 273/148 B; 373/148 B; 341/20, 22

[56] References Cited

U.S. PATENT DOCUMENTS 5,008,528  4/1991  Duchon ................................ 250/221

*Primary Examiner*—Mark R. Powell
*Assistant Examiner*—Doon Chow
*Attorney, Agent, or Firm*—Bacon & Thomas

[57] ABSTRACT

An improved photoelectric sensor for an X-Y input device, the input device including vertical and horizontal slotted discs at ends of respective vertical and horizontal shafts, the discs being situated adjacent but not touching one another, is made up of a single photoelectric sensor and a single LED installed on opposite sides of the portions of the slotted discs that are adjacent each other, with the photosensor including four photoelectric sensor areas A, B, C, and D located on a single chip and having a width corresponding to the width of a slot or slotted wall of the slotted disc such that the rotation direction of the respective discs can be determined by whether the phase difference between signals generated by sensors A and B, and between signals generated by sensors C and D, is positive or negative.

2 Claims, 6 Drawing Sheets

PHOTOELECTRIC SENSOR FOR AN X-Y POSITION DEVICE

BACKGROUND OF THE INVENTION

1. Field of the Invention

The present invention is an improved photoelectric sensor for an X-Y position input device which is made up of four photoelectric sensor areas on a photoelectric sensor chip in order to reduce the number of parts, to save production cost, and to reduce the defective rate.

2. Description of the Prior Art

The conventional optomechanical mouse uses the horizontal axis and vertical axis (referred to hereinafter as the X-axis and the Y-axis) of a photoelectric sensor X-Y position device to control the mouse cursor to a relative position on a monitor. However, the photoelectric sensor for the X-axis and Y-axis is made up of two phototransistors, two LEDs; one slotted disc and one shaft. The emitting sides of the LEDs face the receiving sides of the phototransistors (the respective pairs of components being hereinafter referred to as photoelectric sets), with the slots and slotted wall of the slotted disc set up in between the two photoelectric sets. When the shaft drives the slotted disc to rotate, it causes illumination or shade from the light of the LED, and the intermittent light signal which is received by the phototransistors is used to produce a series of pulse signals to control the mouse control circuit. Generally, the slotted disc uses the two identical photoelectric sets to generate a set of signals having a phase difference which depends on whether the slotted disc rotates forward or backward. In general, if the X-axis slotted disc rotates forward, the cursor of the monitor moves to the right. In contrast, if the slotted disc rotates backward, the cursor moves to the left. If the Y-axis slotted disc rotates forward, the cursor of the monitor moves up, In contrast, if the slotted disc rotates backward, the cursor moves down. Thus, a ball member drives the X-axis and Y-axis shafts in order to achieve the mouse's objective of controlling the cursor on the monitor.

SUMMARY OF THE INVENTION

According to the above description, one mouse needs four LEDs and four phototransistors (the X-axis and Y-axis need two sets of photoelectric elements each). During production of the mouse, each set of photoelectric sets needs to have its position adjusted to make sure that the light signals are received, and at the same time, the position of the photoelectric sets must be adjusted to have a proper phase difference signal, requiring a back and forth adjustment that makes production of the mouse very slow and keeps the defect rate high.

Therefore, the inventor of the present invention has provided his U.S. Pat. No. 5,331,209, "Assembled Photomechanical Mouse Structure". The invention of U.S. Pat. No. 5,311,209 simplifies the two photoelectric sets of X-axis and Y-axis elements by combining them into one LED and one photoelectric sensor. The chip of this photoelectric sensor has A and B photoelectric sensor areas and makes the width of light and shade of the slotted discs equal to the width of the A and B photoelectric sensor areas. As a result, the signal from the A and B photoelectric sensor areas will produce a positive phase difference or a reversed phase difference in order to determine the rotation direction of slotted disc, eliminating the need to adjust the position of the photoelectric set to have a phase difference, and at the same time saving one LED to simplify the production of the mouse and reduce the defective rate.

The inventor of the present invention has, however, continued to improve the design of the mouse, so that the present invention is an improvement of the photoelectric sensor for the X-Y position input device described in U.S. Pat. No. 5,311,209. It modifies the photoelectric sensor chip to include four photoelectric sensor areas A, B, C, D, so that only one photoelectric set per mouse needs to be installed to produce the control signal from the X-axis and Y-axis, thereby simplifying the circuit, increasing the productivity of the mouse, and reducing the defective rate.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
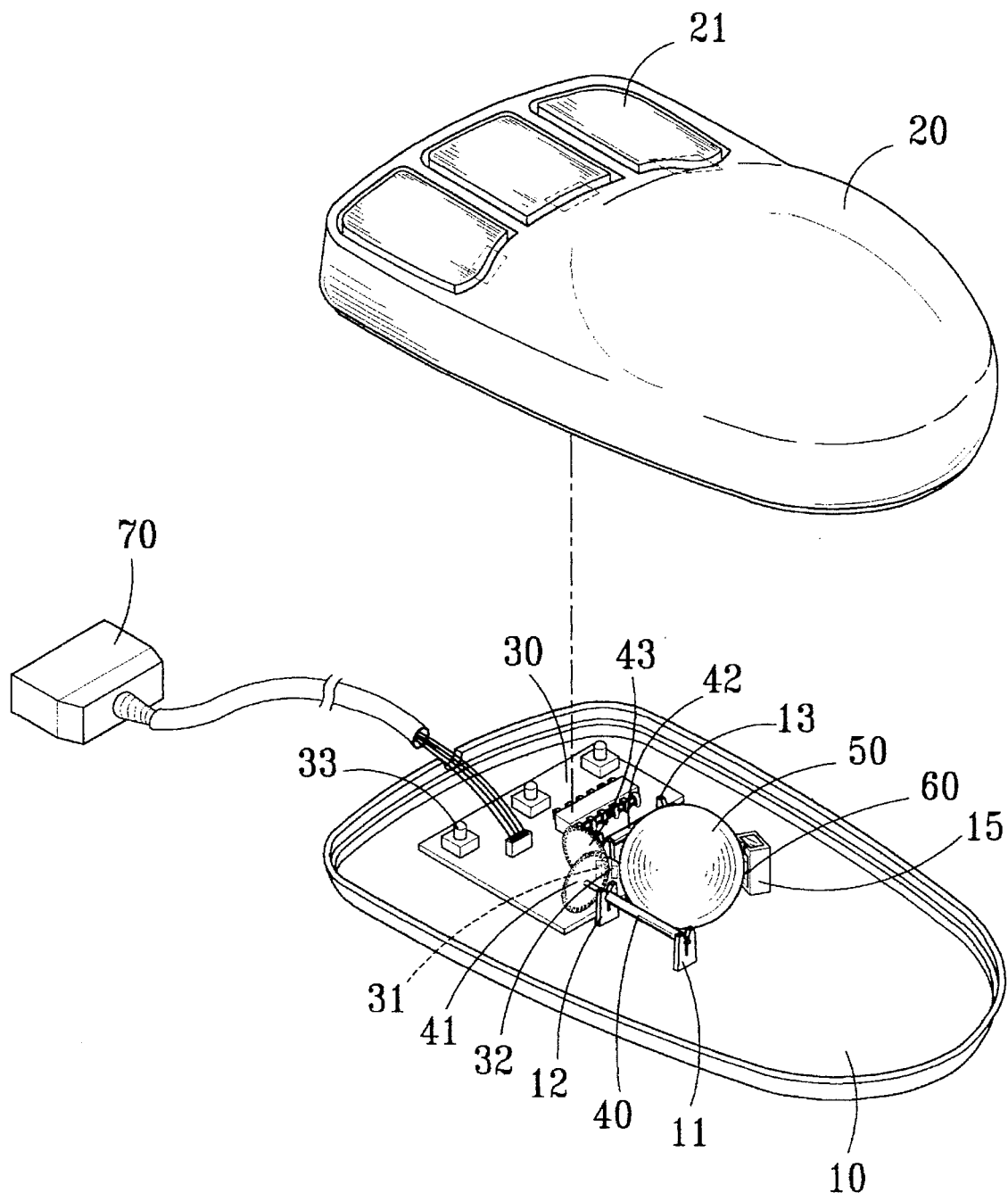
FIG. 1 is a perspective view of structure of present invention.
Figure 2:
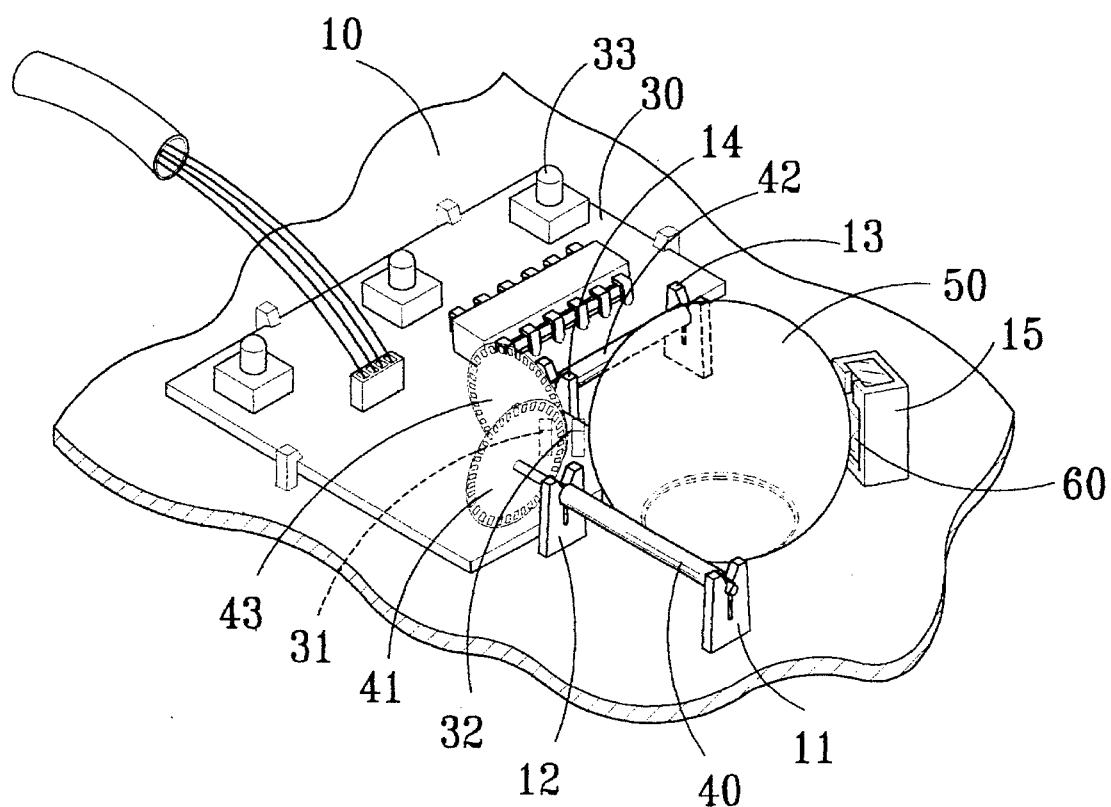
FIG. 2 is a partial perspective view of FIG. 1.
Figure 3:
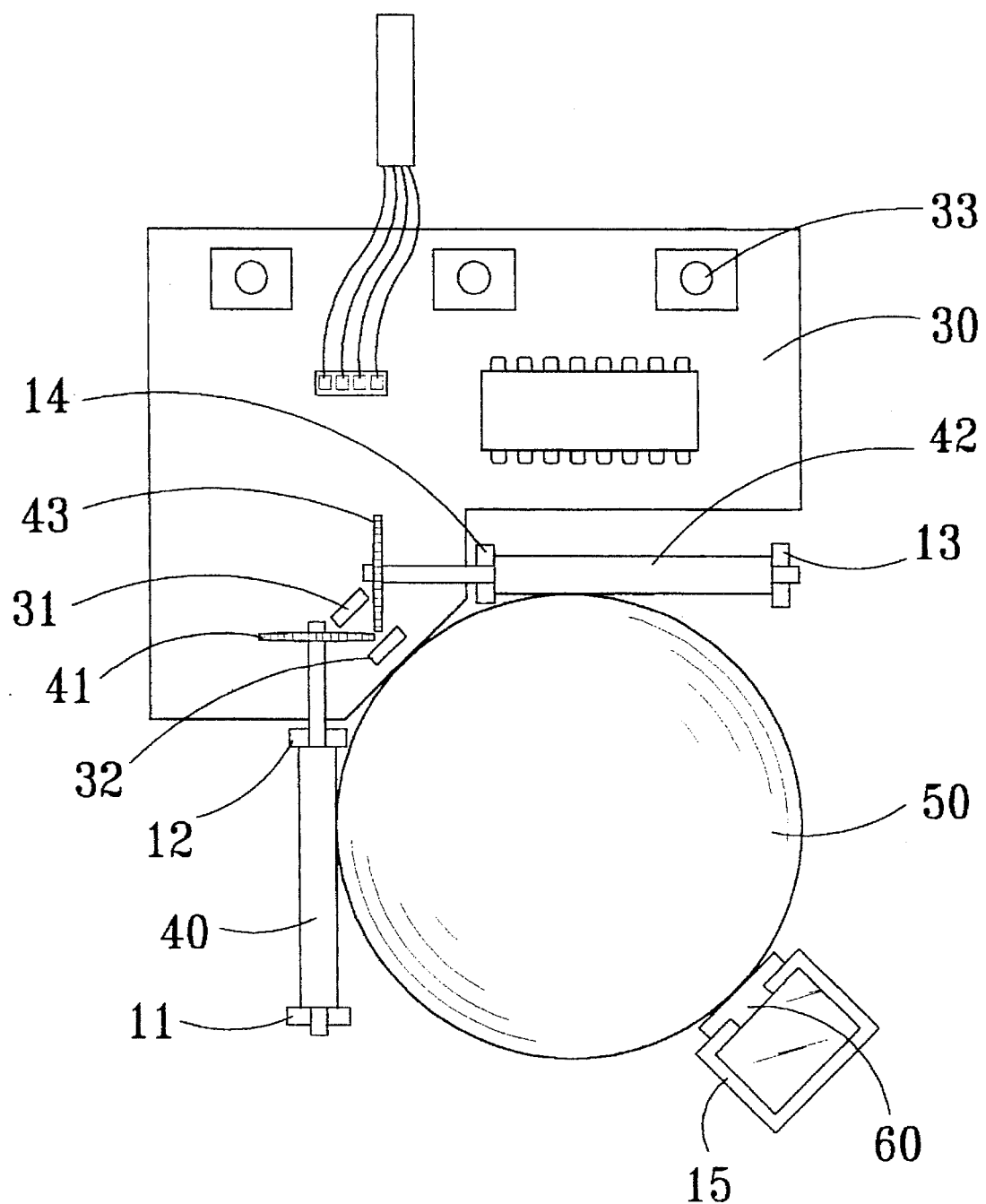
FIG. 3 is an elevational view of FIG. 2.

Please refer to FIG. 1, FIG. 2 and FIG. 3. FIG. 1 is a perspective view of the structure of the present invention. FIG. 2 is a partial perspective view of FIG. 1 and FIG. 3 is an elevational view of FIG. 2. The present invention includes a top (20) which has two or three buttons (21) in front; one bottom casing (10), and in the bottom casing a mouse control circuit (30), one photoelectric sensor X-Y position input device, one ball member (50), one idle roller stand (15) and one mouse signal cable (70). In the front of the control circuit (30) of the mouse are two or three touching switches (33), and in the idle roller stand (15) is a roller (60) which is used to place the ball member (50) close to the shafts (40, 42) for the X-axis and Y-axis. A mouse signal cable (70) transmits the control signal that is received by mouse control circuit (30) to the computer. The focus of the design of the present invention is the photoelectric sensor X-Y position input device which includes the shaft (40) for the X-axis, the slotted disc (41) for the X-axis, the shaft (42) for the Y-axis, the slotted disc (43) for the Y-axis, one LED (31) and one photoelectric sensor (32); a shaft rack (11, 12) used for shaft (40) and slotted disc (41); and a shaft rack (13, 14) used for shaft (42) and slotted disc (43). The slotted discs (41, 43) are circular with several slots and slotted wall on the edge, and on the photoelectric sensor chip (32) are located four photoelectric sensor areas A, B, C, and D.

Figure 4:
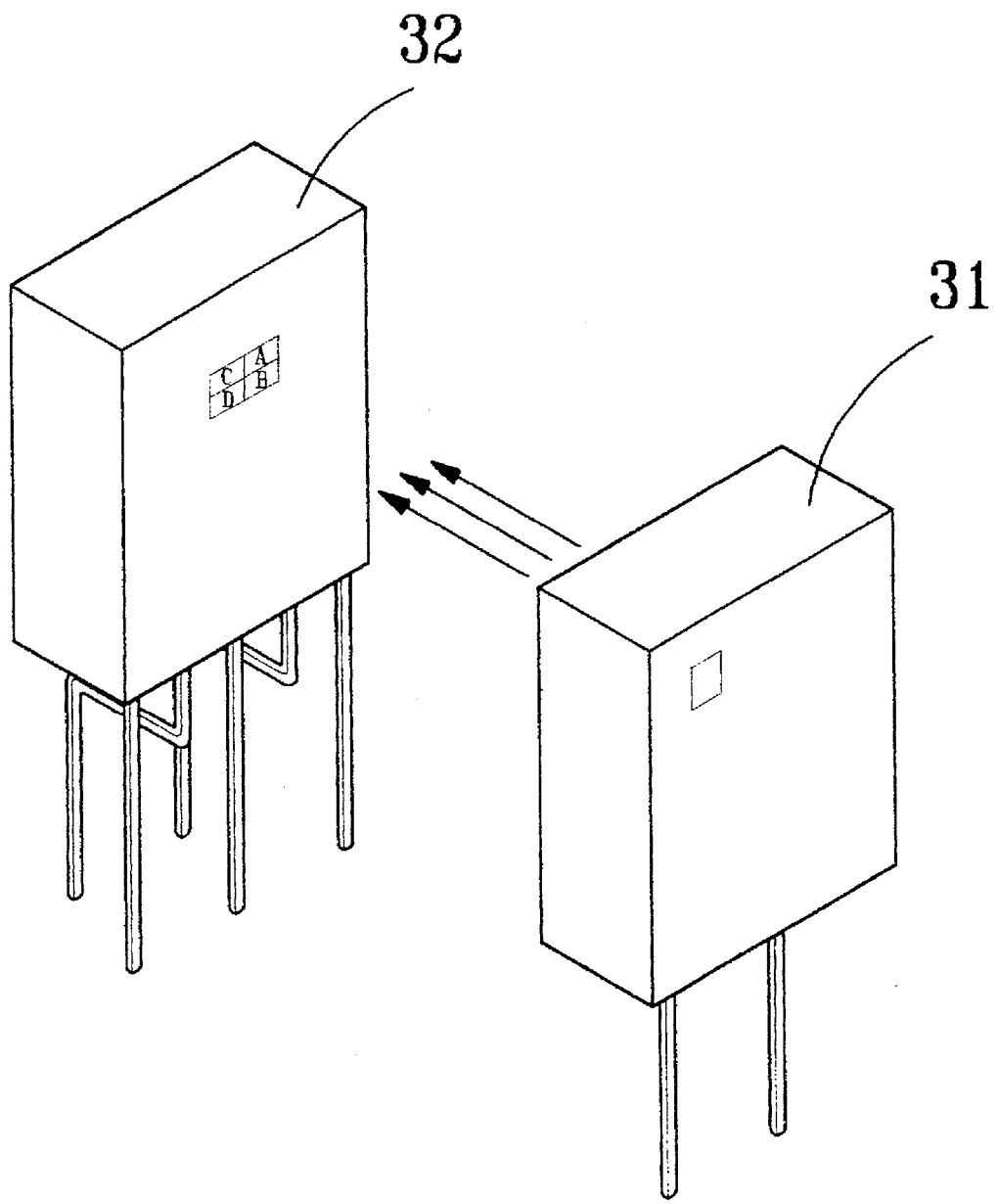
FIG. 4 is a diagrammatic view of an LED and photoelectric sensor of present invention.
Figure 5:
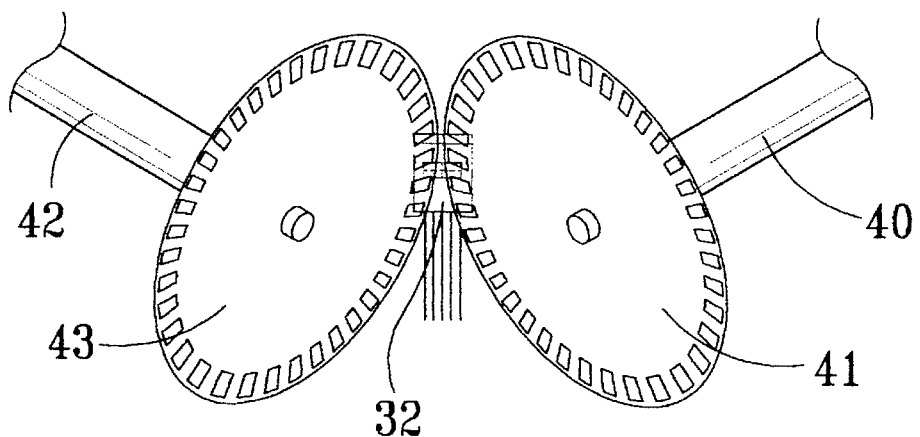
FIG. 5 is a diagrammatic view of the relative position of the slotted disc and photoelectric sensor of present invention.
Figure 6:
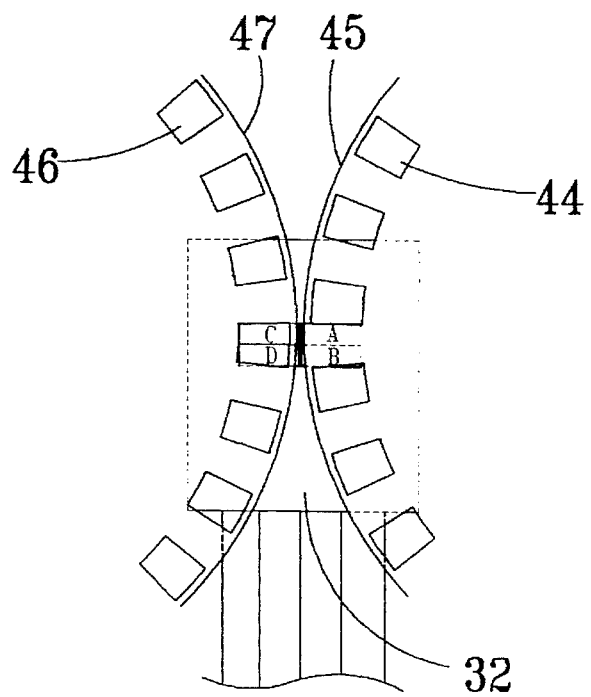
FIG. 6 is a partially enlarged diagrammatic view of FIG. 5.

As shown in FIG. 4, FIG. 5 and FIG. 6 which constitute a diagrammatic view of the LED and photoelectric sensor of the present invention, a diagrammatic view of the relative position of slotted disc and photoelectric sensor, and a partially enlarged diagrammatic view of FIG. 5, the present invention only includes one LED (31) and one photoelectric sensor (32). The light emission side of LED (31) faces the receiving side of photoelectric sensor (32), and the chip of photoelectric sensor (32) includes the photoelectric sensor (32), and the chip of photoelectric sensor (32) includes the four photoelectric sensor areas A, B, C and D which can receive the light from LED (31). The photoelectric sensor (32) divides the chips into quadrants during processing of the semiconductor to form the four photoelectric sensor areas to include five or more than five pins to output the photoelectric signal. The photoelectric sensor (32) is installed at the closest end of the slotted discs (41, 43) of the X-Y axes and the LED is installed at the other end to face the photoelectric sensor. The slots of slotted disc (41) for the X-axis just pass through the A and B photoelectric sensor areas and the slots of slotted disc (43) for the Y-axis just pass through the C and D photoelectric sensor areas. Moreover, the width of A, B or C, D is related to the width of the slots or the slotted walls of slotted discs so that the A to B signals produce a positive or reversed phase difference, as do the C to D signals.

Figure 7:
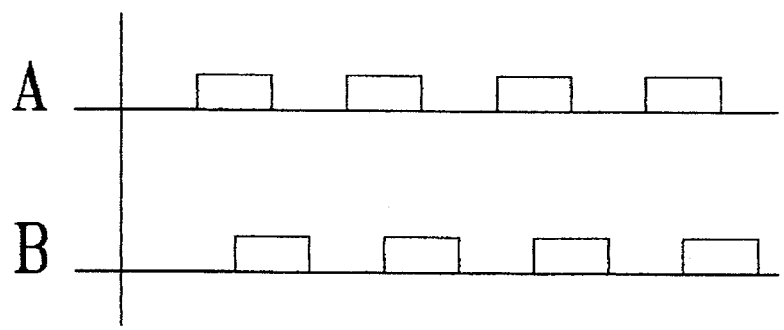
FIG. 7A is a diagrammatic view of the A and B chip signals of the present invention.
FIG. 7B is a diagrammatic view of the C and D chip signals of the present invention.
Figure 7:
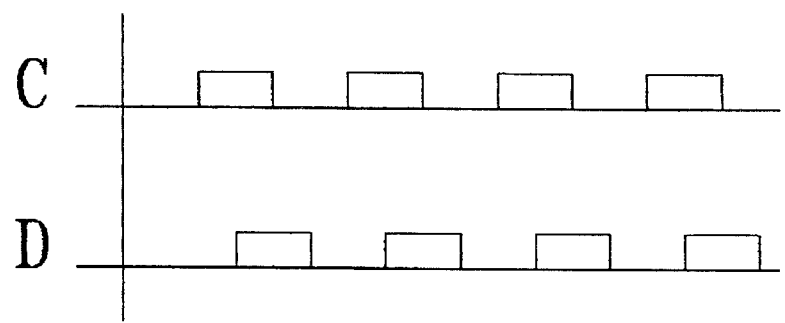

In operation, when the ball member (50) moves, it will drive the shaft (40) for the X-axis, and cause the X-axis slotted disc (41) to rotate. At the same time, the slot (44) and the slotted wall (45) of slotted disc (41) illuminate or shade the A and B photoelectric sensor areas top make them receive the light from the LED discretely, and the photoelectric sensor areas will produce a series of signals having a positive phase difference or a reversed phase difference (as shown in FIG. 7A). This signal allows the mouse control circuit (30) to determine whether the X-axis slotted disc (41) is rotating forward or backward. Similarly for the Y-axis, when the ball member (50) moves, it drives the shaft (42) for the Y-axis, and causes the Y-axis slotted disc (43) to rotate. At the same time, the slot (46) and the slotted wall (47) of slotted disc (41) illuminate or shade the C and D photoelectric sensor areas to produce a series of signals with a positive phase difference or a reversed phase difference (as shown in FIG. 7B). This signal can determine whether the Y-axis slotted disc (43) is rotating forward or backward.

Based on the embodiment described above, the present invention can reduce the LED and photoelectric sensor of the X-Y position input device to one piece, by utilizing four photoelectric sensor areas on a photoelectric sensor chip, and thus can control the cursor of monitor, reduce the usage of parts in order to save cost, make the adjustment easier, and reduce the defective rate.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. In a photoelectric sensor arrangement for an X-Y input device includes:

a top casing and a bottom casing that together form a casing for a photoelectric sensor X-Y position device in which is positioned a vertical shaft, a horizontal shaft, a vertical slotted disc positioned at an end of the vertical shaft, a horizontal slotted disc positioned at an end of the horizontal slotted disc, a ball member, an idle roller arranged 1to press the ball member against the vertical and horizontal shafts to cause the vertical and horizontal shafts, and therefore the vertical and horizontal discs, to rotate in response to movement of the ball member, the position signals generated by the photoelectric sensor, the improvement wherein:

portions of the vertical and horizontal slotted discs are very close to each other but do not touch, an LED is positioned on one side of the slotted discs to face said very close portions, a photoelectric sensor is positioned on an opposite side of the slotted discs to face the LED, the photoelectric sensor includes four photoelectric sensor areas A, B, C, and D on a single photoelectric sensor chip, said areas having widths corresponding to widths of the slots such that rotation of the vertical disc causes light from the LED to alternately illuminate areas A and B and rotation of the horizontal disc causes light from the LED to alternately illuminate areas C and D, the respective areas generating signals when illuminated or shaded, a direction of rotation of the vertical disc is determined by whether a phase difference between signals generated by areas A and B is positive or negative, and a direction of rotation of the horizontal disc is determined by whether a phase difference between signals generated by areas C and D is positive or negative.

2. The improved photoelectric sensor arrangement of claim 1, wherein the four photoelectric sensor areas on the single photoelectric sensor chip consist of four quadrants of a processed semiconductor chip, and wherein the signals generated by the respective sensor area are output from the chip by means of at least five output pins.

* * * * *